P. NERNEY.
Method of Making Curbed Chains.

No. 229,742. Patented July 6, 1880.

WITNESSES.
A. A. Greene.
Wm A. Cady.

INVENTOR.
Peter Nerney
by
Edson Salisbury Jones.
Attorney.

UNITED STATES PATENT OFFICE.

PETER NERNEY, OF ATTLEBOROUGH, MASSACHUSETTS.

METHOD OF MAKING CURBED CHAINS.

SPECIFICATION forming part of Letters Patent No. 229,742, dated July 6, 1880.

Application filed December 31, 1879.

*To all whom it may concern:*

Be it known that I, PETER NERNEY, of Attleborough, in the county of Bristol and State of Massachusetts, have invented a new and Improved Method of Making Curb-Chains; and I do hereby declare that the following specification, taken in connection with the accompanying drawings, forming a part of the same, is a full, clear, and exact description thereof.

My improvement relates both to single and double curb-chains; and it consists in swaging the links before they are combined in a chain into a form approximating that which the said links assume when the chain is completed, the said swaged links being of such a shape that they may be united without being opened, so that in making a curb-chain it is only necessary to hook my improved links together and close their ends, (and solder said ends, if desired,) when the chain will be complete.

In the manufacture of curbed chains as ordinarily practiced the wire is wound about an oval mandrel, so as to form a spiral coil. This coil is subjected to the action of a saw, which divides the coil longitudinally and separates it into as many links as there are convolutions of wire. In forming a chain from these links they are first opened in a direction at right angles to the plane of the link, then united, then their ends are closed and soldered, and finally the chain is twisted to give it a desirable amount of curb. This operation of twisting almost invariably forces open one or more links, which have to be resoldered before the curbing can be completed, and this may occur a number of times before the chain is sufficiently curbed. The ordinary method, therefore, is comparatively expensive and often produces an imperfect chain.

By my improved method each link is separately swaged by properly-formed tools into a shape approximating the form which it assumes in the completed chain, the shape of each link being such that when the ends are closed by being brought into alignment a fully-curved link is produced.

Figure 1:
Figure 2:
Figure 3:
Figure 4:

Such a link is shown in side view at Figure 1 of the drawings, and in end view at Fig. 2. Fig. 3 represents a portion of a single curb-chain formed of my improved links, and Fig. 4 shows a portion of a double curb-chain made from said links.

As shown at Fig. 2, the ends of the swaged link both lie in the plane $x\ x$, but occupy different planes passing at right angles to the said plane $x\ x$. The ends of the link are open, therefore, and the links may be united without changing their form, and may be brought into their final shape by simply closing the ends.

I am aware that unsoldered double curbed chains have been made heretofore from links which were bent or twisted, before being put together, into the exact form that the links in a chain made by the ordinary method assume after being put together, soldered, and twisted. Links so formed, however, have to be opened before they can be united with each other, at comparatively considerable expense for hand labor, and often to the detriment of the strength, curve, and appearance of the links, particularly when they are made from plated stock.

Plated wire for chain-links is usually formed in the following manner: A flat strip of plated stock is drawn up into a hollow tube, and by successive drawings this tube is reduced in diameter until it is practically compact, with a longitudinal seam at the contact of the edges of the original strip. Links formed of such wire and bent or twisted into a completely-curbed shape, as just described, are often injured by the process of opening and closing, which operation tends to spread the seam in the wire and produce an imperfect link; and when it is considered that such links have to be opened and closed ofttimes more than once in order to bring the ends into the proper position, it will be seen that these links made from any kind of stock are quite liable to be weakened and the shape of said links partially changed.

In forming a chain from my improved links they only require to be closed. The expense of opening by hand is therefore avoided, and the links are not weakened or their shape changed by successive openings and closings.

Having described my invention, what I claim, and desire to secure by Letters Patent, is—

1. The improvement in the art of making chains the links of which are butt-jointed and twisted, as shown in Figs. 3 and 4, bending the rod or link-blank to the form shown in Fig. 2, the meeting surfaces—at right angles to the axis of the rod—lying in parallel planes, but separated by a space sufficiently wide to admit the next succeeding link, and closing the link only after it has been applied to another link, as set forth.

2. The improvement in the art of making butt-jointed and twisted chain-link blanks, which consists in swaging the rod or link-blank into the form shown in Figs. 1 and 2, with the meeting surfaces—at right angles to the axis of the rod—lying in the same or parallel planes, but separated by a space sufficiently wide to admit another link, whereby the opening of the link-blank by hand for connection with another link is avoided, substantially as set forth.

PETER NERNEY.

Witnesses:
EDSON SALISBURY JONES,
A. A. GREENE.